United States Patent [19]

Pepper

[11] Patent Number: 4,598,726

[45] Date of Patent: Jul. 8, 1986

[54] ULTRASONICALLY OPERATED WATER FAUCET

[76] Inventor: Robert B. Pepper, 55-140 Calhoun St., Thermal, Calif. 92274

[21] Appl. No.: 658,051

[22] Filed: Oct. 3, 1984

Related U.S. Application Data

[60] Continuation of Ser. No. 486,789, Apr. 20, 1983, abandoned, which is a division of Ser. No. 247,997, Mar. 26, 1981, Pat. No. 4,402,095.

[51] Int. Cl.⁴ ................................................ E03C 1/05
[52] U.S. Cl. .......................................... 137/1; 4/623;
  4/305; 4/302; 4/DIG. 3
[58] Field of Search ...................... 137/1; 251/131;
  4/DIG. 3, 100, 304, 623

[56] References Cited

U.S. PATENT DOCUMENTS

| | | | |
|---|---|---|---|
| 3,151,340 | 10/1964 | Teshiwa | 251/131 |
| 3,575,640 | 4/1971 | Ishikawa | 4/304 X |
| 3,863,196 | 1/1975 | Hilles | 4/304 X |
| 4,141,091 | 2/1979 | Pulvari | 4/DIG. 3 |

Primary Examiner—Alan Cohan
Attorney, Agent, or Firm—Patrick J. Barrett

[57] ABSTRACT

A water faucet is disclosed that is automatically turned on and off in response to the proximity of the user's hand or other object to the faucet. An ultrasonic transducer is located in the faucet near the water outlet and transmits bursts of ultrasonic waves. When a wave reflects off a user's hand and creates an echo signal, the echo is detected by the ultrasonic transducer. Circuitry connected to the ultrasonic transducer determines when an object is within a predetermined distance of the faucet by measuring the time elapsed between the transmission of the burst and the reception of the echo. Once an object is within this predetermined distance, the circuitry causes a valve to open and water is supplied by the faucet.

14 Claims, 13 Drawing Figures

ULTRASONICALLY OPERATED WATER FAUCET

CROSS REFERENCE TO RELATED APPLICATION

This application is a continuation of application Ser. No. 486,789, filed on April 20, 1983, now abandoned which is a division of application Ser. No. 247,997, filed Mar. 26, 1981, now U.S. Pat. No. 4,402,095.

BACKGROUND OF THE INVENTION

This invention relates to the field of water faucets for use in sinks and the like and more particularly to faucets that turn on or off automatically.

Water faucets that will turn off by themselves have been used for years in public lavatories in order to guard against the waste of water due to faucets being left on accidentally. Where both hot and cold water is available from the faucet, it is doubly important to prevent the waste of hot water since energy must be consumed to heat the water.

The shut-off mechanisms used in the past have usually been spring loaded return devices in the valve mechanism itself. The valve itself may take the form of a spring loaded knob which the user turns approximately one quarter to one half a turn. When the knob is released by the user it returns to its off position. Alternatively the knob may be one which the user pushes to cause water to flow. In either of these types of faucets a delay mechanism may be built in so that the water will flow for a predetermined amount of time after the knob is released so that the user may wash both hands together. This solution is seldom completely satisfactory because the amount of delay may be too little for some users and for others it may be more than necessary, thus wasting water.

There are many industrial applications for water faucets where it is desirable to have a valve mechanism which can be turned on and off without having to use the user's hands. For example, in hospitals, laboratories and industrial work areas of various types one often finds foot or knee operated faucets. These allow the user to wash his hands or objects in his hands without having to operate a faucet control with his hands. This is often necessary for sanitary as well as convenience reasons. However, these types of faucets can be allowed to run longer than is required, thus wasting water.

Home use also accounts for a significant amount of water usage. It is not uncommon for water to be left running while a person does another task and then returns to the sink. Handicapped persons also frequently have difficulty in using standard faucets in an economical manner, and sometimes they require special faucets that can be operated with very little force or with parts of their bodies other than their hands.

None of these prior art devices fully satisfies the need for a faucet which supplies water just for the time it is needed. In addition, some of these mechanical devices only partially satisfy the needs which they were designed to meet, and they are becoming increasingly more expensive to manufacture.

SUMMARY OF THE INVENTION

In accordance with the preferred embodiment of the present invention a water faucet is provided which has an ultrasonic sensor to sense the presence of a user's hand or an object that is within a desired proximity of a faucet. The ultrasonic sensor is connected to a control circuit that activates an electrically controlled valve. When the user's hand is brought under the faucet the water is turned on and remains on for as long as the user's hand is under the faucet. When the user's hand is removed, the water is shut off, thus ensuring no more water than is necessary is used.

The ultrasonic sensor comprises an electostatic, ultrasonic transducer connected to driving and detection circuitry. The transducer is mounted on the faucet near the water outlet and is connected to the circuitry by wires in the faucet housing. The circuitry is contained in a waterproof housing and is in turn connected to a solenoid valve in the water line leading to the outlet. Drive circuitry causes the transducer to emit bursts of ultrasonic waves of selected frequencies. An object in the path of these waves will reflect some of them back to the transducer and will be detected by the transducer. Detection circuitry measures the time between the emission of the burst and the detection of the reflected waves. This time is directly proportional to the distance between the object and the transducer. The circuitry can be set to energize the solenoid valve and turn on the water when an object is detected within a predetermined proximity or range of distances from the transducer. In addition, provision can be made so that the object to faucet distance at which the water is turned on or off can be varied as required by the specific application.

A faucet that is operated by a proximity detector has a number of significant advantages over the prior art. Since the faucet is on only during the time the user's hands are under the faucet, there will be less water wasted. Where such a faucet is used for both hot and cold water, conservation of water will also result in the conservation of energy as less hot water is used. In industrial and medical applications such a faucet will be more convenient to use than ones with prior art mechanical linkages, and there will be less likelihood that water will be wasted. The same will be true of home use, especially for the handicapped who may have difficulty using conventional faucets.

DESCRIPTION OF THE PREFERRED EMBODIMENT

Figure 1:
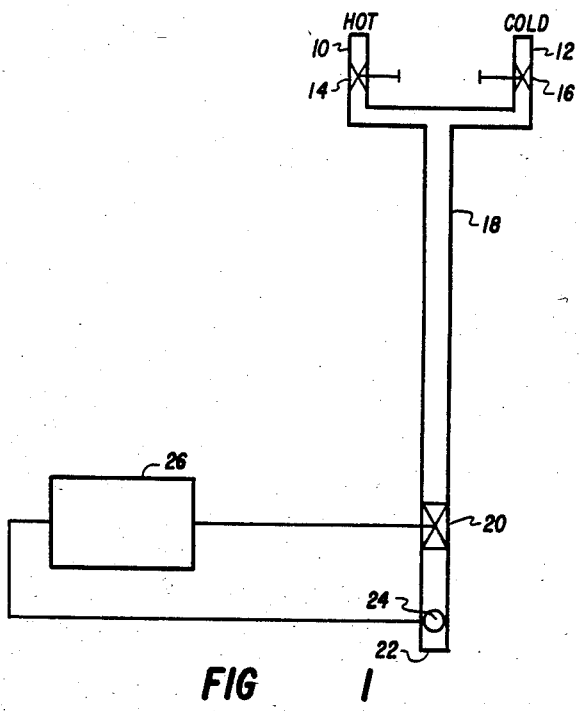
FIG. 1 shows a block diagram of the preferred embodiment of the present invention.

The block diagram of FIG. 1 shows a hot water supply line 10 and a cold water supply line 12 coupled to respective manual valves 14 and 16. The water from the two manual valves is mixed together and supplied to a supply line 18, which in turn is connected to a solenoid valve 20. Water from solenoid valve 20 exits from faucet outlet 22 to a sink (not shown). An ultrasonic transducer 24 is mounted near faucet outlet 22 and is electrically connected to control circuitry 26. The control circuitry is electrically connected to the solenoid valve and opens and closes the valve in response to the signals from ultrasonic transducer 24.

Figure 2:
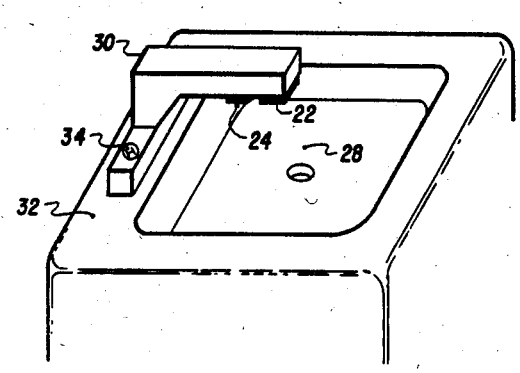
FIG. 2 shows a perspective drawing of a sink with a faucet in accordance with the preferred embodiment of the present invention.

FIG. 2 shows a sink 28 with a faucet 30 mounted over it on a counter 32. Ultrasonic transducer 24 is mounted on the underside of the faucet near outlet 22. There is a control knob 34 for the hot water manual valve to allow for adjustment of the temperature and the flow rate of the water. There is also a control knob for the cold water that is not visible in this view.

Figure 3:
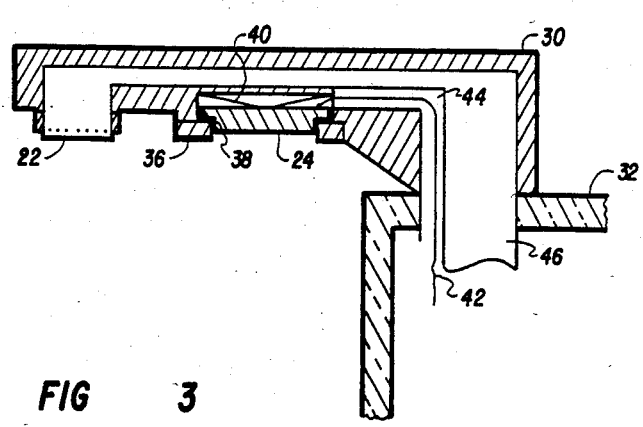
FIG. 3 shows a side cross sectional view of a faucet with an ultrasonic transducer.
Figure 4:
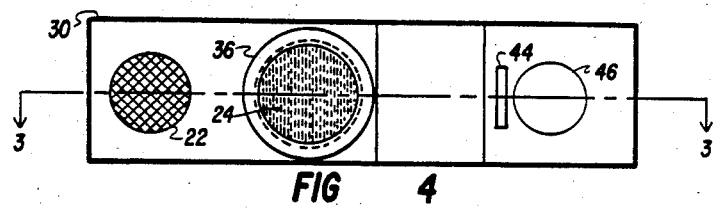
FIG. 4 shows a bottom view of the device of FIG. 3.

In FIG. 3 faucet 30 is shown in cross section, and in FIG. 4 a botton view of the faucet is shown. Ultrasonic transducer 24 is held in the faucet by a bezel 36 and an electrically insulative seal 38. A retaining spring 40 holds ultrasonic transducer 24 against the seal. An electrical cable 42 is connected to the ultrasonic transducer and is protected by a wireway 44 in the faucet. A waterway 46 carries the water from the solenoid valve (not shown in this figure) to outlet 22. The faucet is fastened to the counter in the conventional manner.

Figure 5:
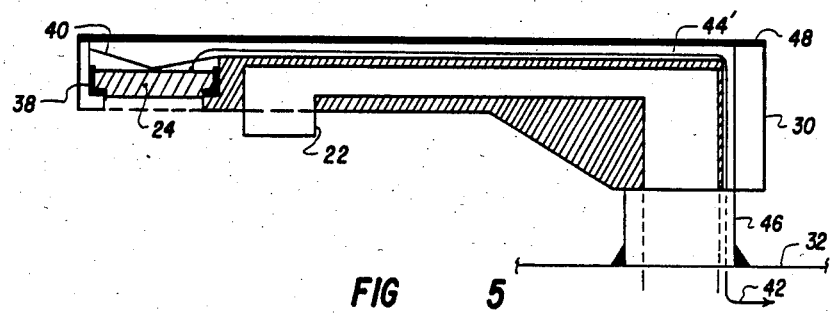
FIG. 5 shows a side cross sectional view of an alternative embodiment of FIG. 3.
Figure 6:
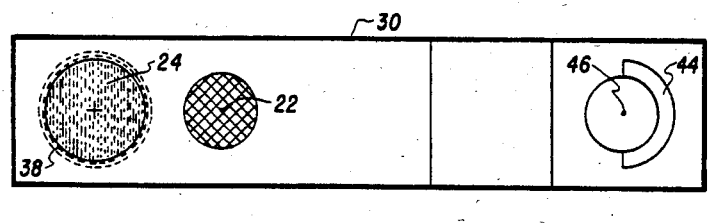
FIG. 6 shows a bottom view of the device of FIG. 5.

FIGS. 5 and 6 show an alternate arrangement of the ultrasonic transducer with respect to outlet 22 to provide for an earlier turn on as the user's hands approach the faucet. Here, with the ultrasonic transducer placed in front of the water outlet, cable 42 is in a wireway 44' formed on top of the waterway and covered by a removeable cover 48.

Figure 7:
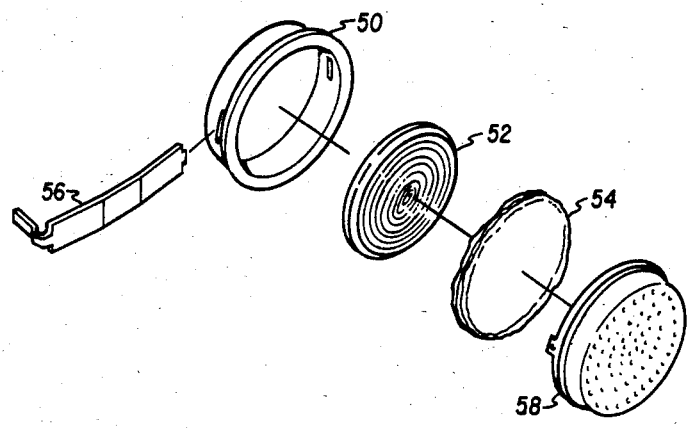
FIG. 7 shows an exploded view of an ultrasonic transducer.

In the exploded view of FIG. 7 it can be seen that ultrasonic transducer 24 comprises an inner ring 50 into which is placed a grooved plate 52 covered by a foil 54. A retainer 56 holds the grooved plate and foil in the inner ring and, the whole assembly is covered by a housing 58. Electrical leads (not shown) are attached to grooved plate 52 and foil 54. The foil comprises a thin insulator covered with a thin conductive layer, and the grooved plate and the foil form a capacitor. This capacitor acts as both an electrostatic loudspeaker and an electrostatic microphone, depending upon the signals applied to it by the circuitry to which it is connected. Ultrasonic waves are generated by placing an alternating current voltage across the plates of the capacitor, and the foil vibrates at the frequency of the voltage, in the same manner as the cone of a loudspeaker. The vibrations of the foil are carried through the air as ultrasonic waves. An ultrasonic transducer of the type just described is disclosed in detail in U.S. Pat. No. 4,085,297 granted April 18, 1978 to Paglia and assigned to the Polaroid Corporation which is hereby incorporated by reference. An alternate embodiment of an ultrasonic transducer is disclosed in U.S. Pat. No. 4,081,626 granted Mar. 28, 1978 to Muggli, et al and also assigned to the Polaroid Corporation.

Figure 8:
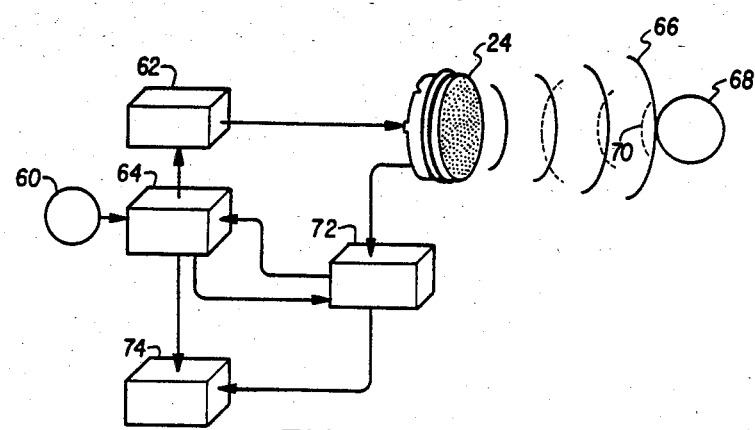
FIG. 8 shows a block diagram of control circuitry with an ultrasonic transducer.

FIG. 8 is a block diagram of control circuitry 26. Ultrasonic transducer 24 is connected to a power interface circuit 62 that is driven by digital section 64. A precisely controlled alternating current signal is supplied to digital section 64 by a clock circuit 60, and the frequency of the waves emitted by the ultrasonic transducer is determined by clock circuit 60. The power interface circuit supplies the transmit signal to the ultrasonic transducer that produces a transmitted ultrasonic pulse 66. Part of this pulse reflects off of an object 68, such as a hand, in its path and produces an echo 70. The echo returns to the ultrasonic transducer, which now acts like an electrostatic microphone; and the foil vibrates in response to the echo. This vibration is detected by an analog curcuit 72 connected to ultrasonic transducer 24. The analog circuit is connected to the digital section, and the digital section receives a processed echo signal from the analog circuit. A solenoid control circuit 74 is connected to digital section 64 and analog circuit 72, and the solenoid control circuit energizes or de-energizes solenoid valve 20 in accordance with the signals received from the analog circuit and the digital section.

Figure 9:
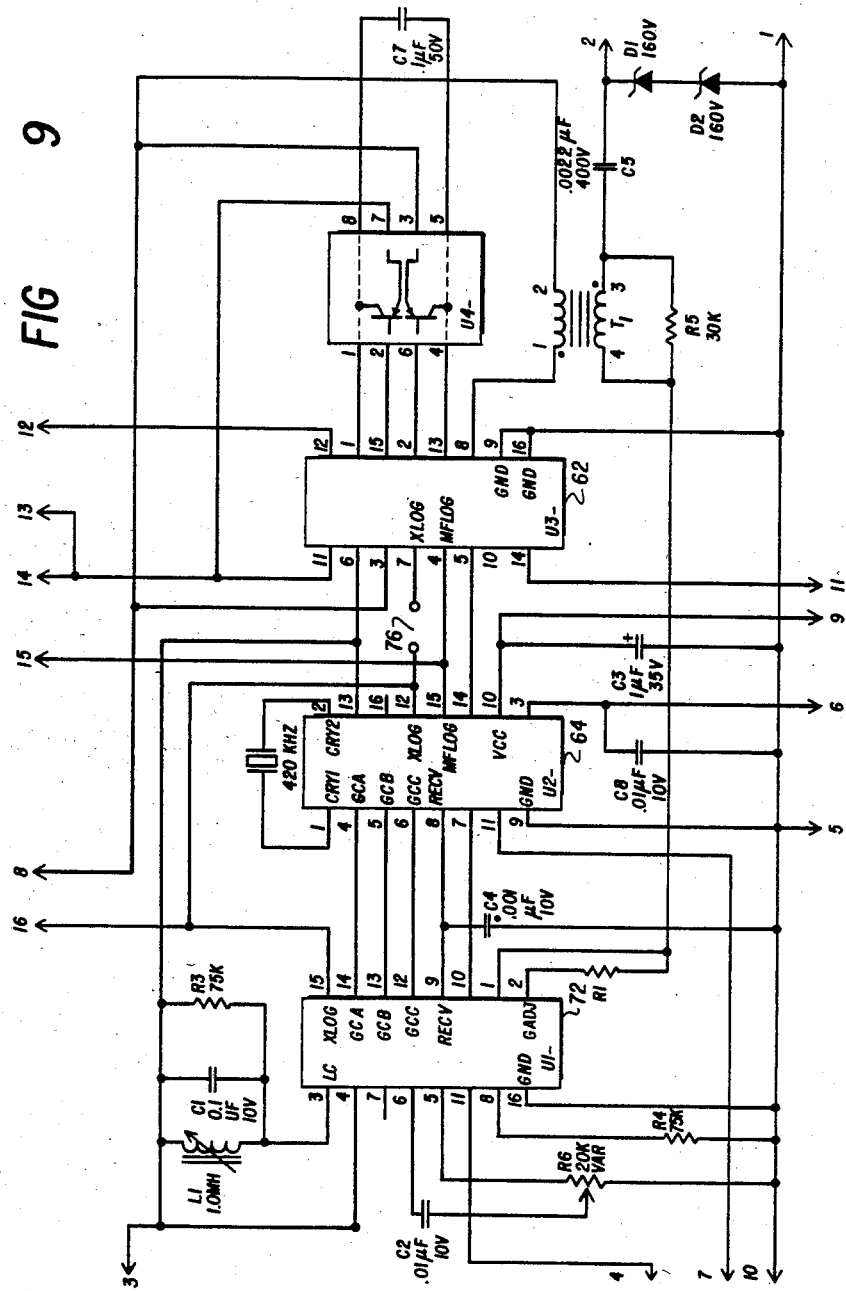
FIG. 9 shows a schematic diagram of a circuit to operate the ultrasonic transducer.

Ultrasonic transducer 24 and the circuitry to operate it, corresponding to clock circuit 60, power interface circuit 62, digital section 64 and analog circuit 72 are available from the Polaroid Corporation in the form of its Ultrasonic Ranging Unit which is used in some of the company's cameras and is also sold separately. FIG. 9 is a schematic diagram of the Polaroid ultrasonic circuit board which operates ultrasonic transducer 24. The transducer is connected to connector pins numbered 1 and 2, and the other relevant connections are shown on subsequent figures showing circuitry that interfaces with the ultrasonic circuit board. The circuits on the ultrasonic circuit board are discussed in greater detail in U.S. Pat. No. 4,199,246 granted April 22, 1980 to Muggli and assigned to the Polaroid Corporation, which patent is hereby incorporated by reference. Alternative ultrasonic ranging circuits are disclosed in the following U.S. Pat. Nos. 3,522,764 granted Aug. 4, 1970 to Biber, 3,523,275 granted Aug. 4, 1970 to Gross and 4,148,574 granted April 10, 1979 to Johnson.

Figure 10:
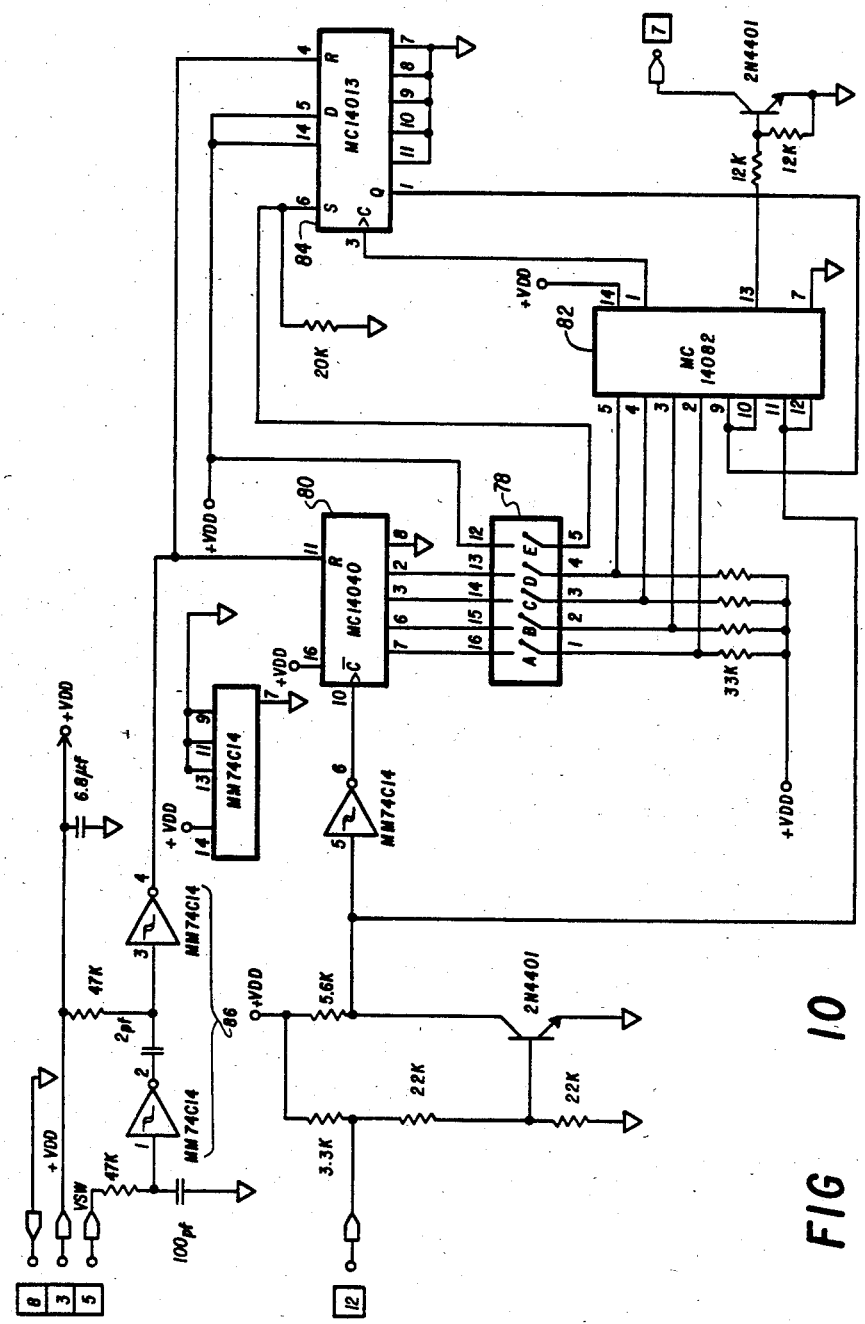
FIG. 10 shows a schematic diagram of a response distance control circuit.

The Ultrasonic Ranging Unit as supplied by Polaroid is set to measure distances between 0.9 and 35 feet. In order to respond to the smaller distances usually encountered between a faucet and a user's hands, some modifications must be made to the Polaroid circuit, as shown in FIGS. 9 and 10. FIG. 10 shows a response distance control circuit that is connected between pin 12 on digital section 64 and pin 7 on power interface circuit 62; the connection point is indicated at 76 in FIG. 9.

The ultrasonic burst transmitted by ultrasonic transducer 24, as supplied, contains 56 cycles. If distances shorter than 0.9 feet are to be measured the number of cycles transmitted needs to be reduced. The circuitry in FIG. 10 provides for selected reduction of the number of cycles transmitted in accordance with the setting of a switch 78. The signal applied to the circuit input at pin 12 is XLOG which corresponds to the length of the transmit burst, and this signal is supplied to an adjustable 12 bit binary counter 80 which is connected to switch 78. The switch selects the number of transmit cycles and the corresponding minimum range in accordance with the following Table I: TABLE I

TABLE I

| Switch Settings | | | | | No. of Transmit Cycles | Minimum Range (approximate) |
|---|---|---|---|---|---|---|
| A | B | C | D | E | | |
| 1 | 1 | 1 | 1 | 0 | 3 | 4.5 inches |
| 0 | 1 | 1 | 1 | 0 | 5 | 4.75 inches |
| 0 | 0 | 1 | 1 | 0 | 9 | 5.3 inches |
| 0 | 0 | 0 | 1 | 0 | 25 | 7.5 inches |
| 0 | 0 | 0 | 0 | 1 | 56 (normal) | 10.8 inches |

Switch 78 is also connected to a dual AND gate 82 and a dual flip-flop 84 which together produce a modified XLOG signal for power interface circuit 62. The connector pins denoted 8, 3 and 5 on FIG. 10 are for connection to corresponding pins in a connector 88 shown in FIG. 11. A monostable multivibrator 86 provides a reset pulse to counter 80 before the start of the transmission of each ultrasonic burst and also resets flip-flop 84.

Figure 11:
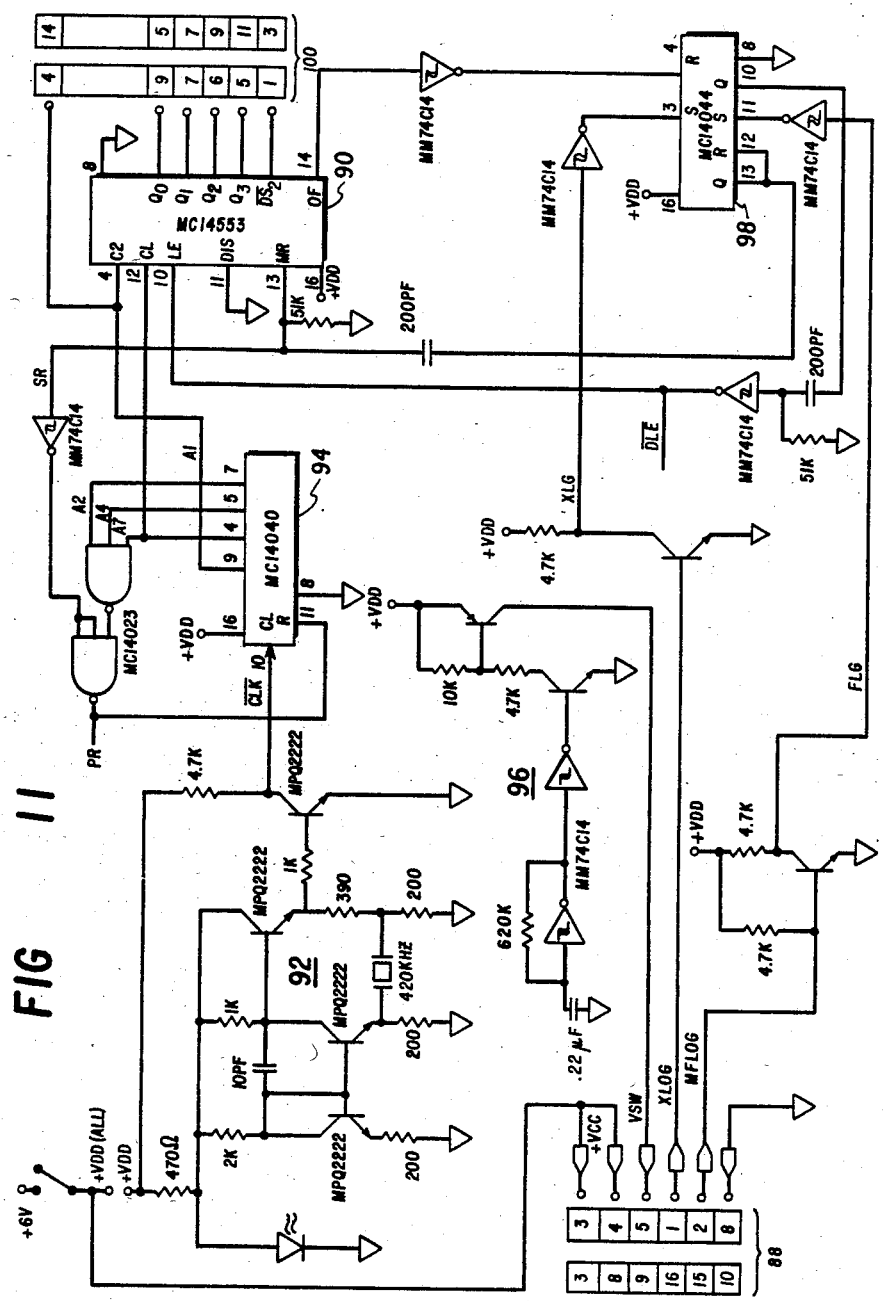
FIG. 11 shows a schematic diagram of a circuit for converting elapsed time signals into distance signals.

FIG. 11 shows a portion of solenoid control circuit 74 which comprises a section of a circuit supplied by Polaroid Corporation know as the EDB. This circuit converts a signal from the ultrasonic circuit board, FIG. 9, that indicates the time elapsed between the transmission of an ultrasonic burst and the receipt of an echo into a signal indicating the distance between the ultrasonic transducer and the object that reflected the burst. Connector 88 connects this circuit to pins on the circuit in FIG. 9 indicated in the left-hand column of boxes on the connector. The heart of the EDB circuit is a three digit binary coded decimal (BCD) counter 90. A clock signal is provided to counter 90 (pin 12) by a crystal controlled oscillator 92 through a divider 94. Each cycle of the output signal of divider 94 is proportional to an increment of distance traveled by the ultrasonic burst. To convert elapsed time into distance counter 90 is started when the ultrasonic burst is transmitted and is stopped when an echo is received. The time the counter has run is then a direct indication of distance between ultrasonic transducer 24 and the object that produced the echo.

An oscillator 96 provides a periodic VSW signal to initiate the transmission of an ultrasonic burst. The VSW signal is supplied to the circuits in FIGS. 9 and 10. The XLOG signal from digital section 64 indicates the exact time of transmission of the ultrasonic burst and is supplied to a latch 98 which in turn supplies a start signal to counter 90. When an echo is received, digital section 64 produces a signal MFLOG which is also supplied to latch 98, and latch provides a stop signal to counter 90. The output pins Q0, Q1, Q2 and Q3 carry a digital signal indicating the value of one of three siginificant digits representing distance between the ultrasonic transducer and an object. Three other output pins, one of which is denoted DS2, indicate which of the three significant digits is present on the output pins Q0 through Q3. A connector 100 shows the connection points between the output pins on counter 90 and the input pins on an input circuit in FIG. 12.

Figure 12:
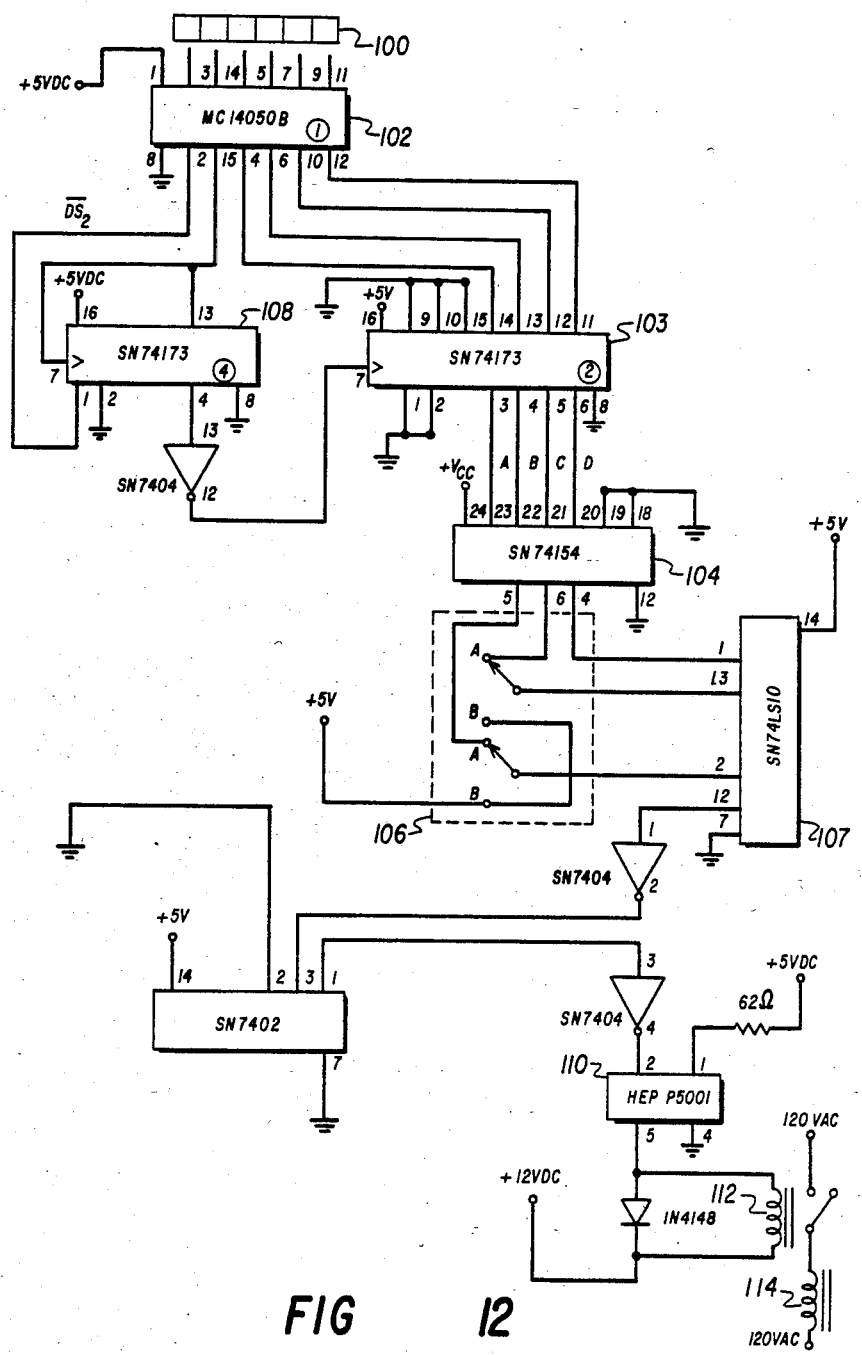
FIG. 12 shows a schematic diagram of a circuit to convert distance signals into on-off signals for a faucet.

FIG. 12 is a schematic diagram of a circuit used to convert the distance information from the EDB circuit in FIG. 11 into an on-off signal for solenoid valve 20. An input buffer circuit 102 is connected to counter 90 in the EDB circuit as described above and supplies buffered digital signals to a quad latch 103. The quad latch in turn is connected to a four line to one of 16 decoder 104. Decoder 104 is used to select the particular value of the least significant digit from counter 90 corresponding to the desired turn-on distance for the faucet. In addition, ranging control is provided by the setting of a switch 106, in cooperation with a NAND gate 107, that is also connected to decoder 104. The digit select signal DS2 is supplied to a latch 108 as is the clock signal from the EDB circuit. When digit select signal DS2 appears, it indicates that the second most significant digit is on the digital output of counter 90 and that consequently the signal that is already in latch 103 is the least most significant digit. At this time the clock signal from the EDB circuit is latched in latch 108, and this latched clock signal is supplied to latch 103. The least significant digit is thereby latched in latch 103 and is decoded by decoder 104.

Ranging control of on-off distances is provided by a switch 106 connected to a NAND gate 107. The switch is also connected to outputs of decoder 104 that correspond to possible turn-on distances selected to be less than the distance from the ultrasonic transducer to the bottom of the sink, and the settings of the switch determine the actual turn-on distance. In this embodiment, output pin 13 of decoder 104 corresponds to a turn-on distance of 0.3 feet and output pins 15 and 14 to 0.4 and 0.5 feet, respectively. When an object is within the distance corresponding to one of these output pins, the signal on that output will go low. When a signal on any one of the inputs of NAND gate 107 is low, the output of NAND gate 107 is high, which causes the water to be turned on as is described below. If input pins 13 and 2 of NAND gate 107 are connected to +5 V by switch 106, then the water will be turned on when an object is within 0.3 feet of the faucet. If the signal on decoder 104 output pin 15 is connected to NAND gate 107, the water will be turned on when an object is within 0.4 feet of the faucet; and if the signal on pin 14 is connected to the NAND gate, the water will be turned on when an object is within 0.5 feet. Thus through the use of switch 106 the faucet can be turned on or off at various predetermined heights above the bottom of the sink to allow for the presence of objects in the bottom of the sink without causing the faucet to turn on. In addition, it can be used to govern the amount of water used by controlling how close a user's hands must be to the faucet before the water will turn on as well as how far a user's hands can be from the faucet before it will turn off.

The output signal from NAND gate 107 (pin 12) is passed through some additional circuits for buffering and override control to an optical coupler 110. The optical coupler drives a relay 112 which in turn drives a solenoid 114 in solenoid valve 20. In the preferred embodiment, the relay is a Potter and Brumfield R10-EI-X2 V-185 and the solenoid valve is an Eaton BK-25840-1 S-53, a type used in appliances such as washing machines and dish washers.

Figure 13:
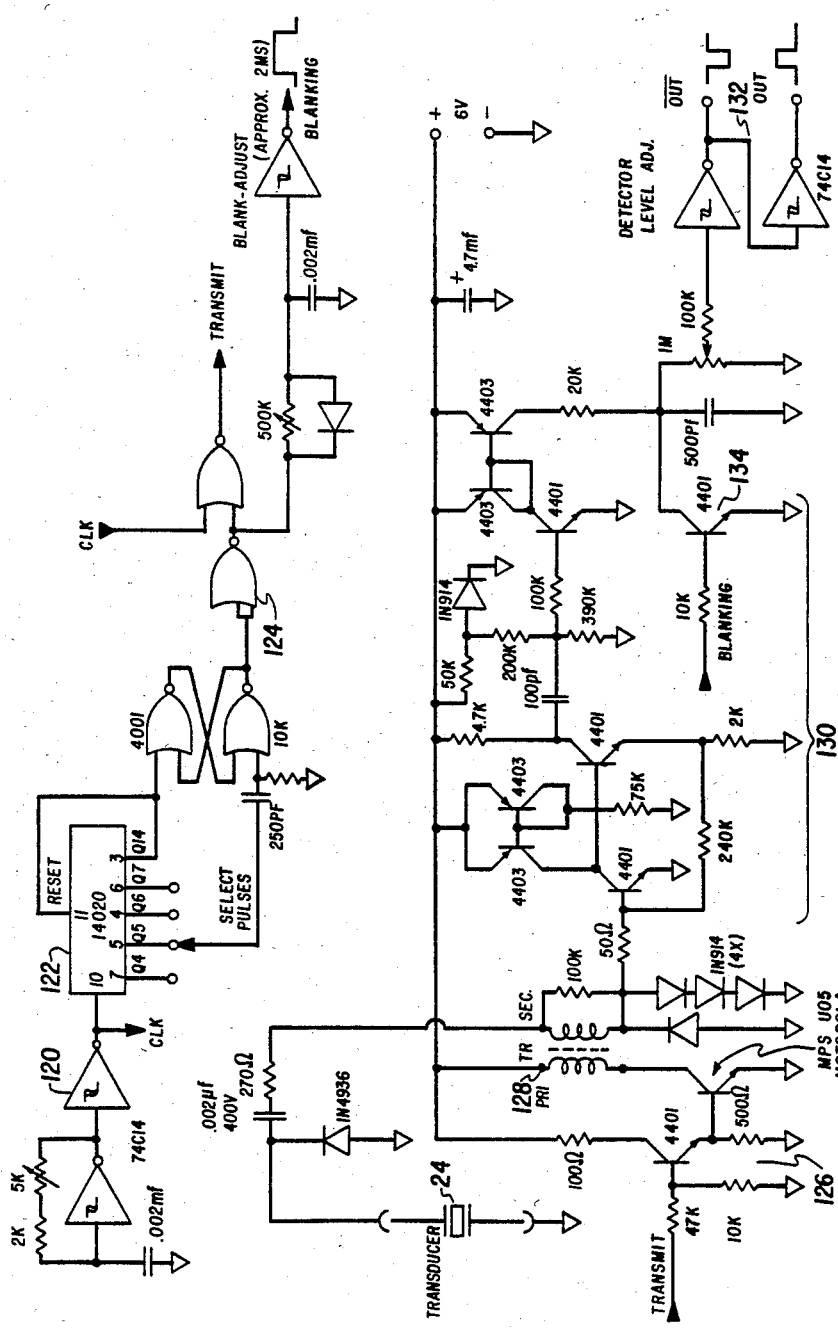
FIG. 13 is a schematic diagram of an alternate circuit to operate the ultrasonic transducer.

FIG. 13 shows a schematic diagram of an alternate circuit to operate the ultrasonic transducer that is simpler than the ultrasonic circuit board supplied by Polaroid. A 47 to 50 kHz ultrasonic signal for the ultrasonic transducer is produced by an oscillator 120 and the number of cycles of the ultrasonic signal that is to be transmitted in each signal burst is determined by a divider circuit 122 and logic circuitry 124 connected to oscillator 120. The number of cycles in the transmitted burst depends upon which output of divider circuit is connected to a select pulses input of logic circuitry 124. For output Q4 there will be 8 cycles; for Q5, 16 cycles; for Q6, 32 cycles; and for Q7, 64 cycles. The transmit signal from logic circuitry contains a signal burst approximately every 200 milliseconds.

The transmit signal is supplied to the ultrasonic transducer through an amplifier 126 and a transformer 128. The transformer is wound around a Ferroxcube core No. 1107 A250 using 5 turns of No. 32 wire in the primary winding and 220 turns of No. 38 wire in the secondary winding. Echoes received by ultrasonic transducer 24 are amplified and detected in an amplifier and detector circuit 130 connected to the secondary of transformer 128. The output of circuit 130 is delivered to a complementary output buffer circuit 132 to which is also connected a blanking circuit 134 to blank the output when a burst is being transmitted.

When the faucet is used in a typical kitchen sink, it has been found convenient to use 0.5 feet as the normal turn-off distance and 0.3 to 0.4 feet as the turn-on distance. It will be appreciated by those skilled in the art that other distances can be chosen to suit the particular application for which the faucet is used, and that the turn-on and turn-off distances depend on the distances and geometrical relationships between the faucet and the top and the bottom of the sink or other receptacle for the fluid from the faucet.

It will also be appreciated that other parameters can be varied without departing from the spirit and scope of the invention. For example, other drive circuits can be used for the ultrasonic transducer and other types of transducers are available. The location of the ultrasonic transducer on the faucet may also be varied to suit the particular conditions of its use. It has been found convenient to use an ultrasonic transducer in the preferred embodiment that has a cone of radiation of about 30 degrees, with an ultrasonic signal drop of about 20 dB at 20 degrees off axis, so that objects outside of the immediate vicinity of the faucet do not cause the faucet to turn on. However, there may be applications where a wider or narrower cone of radiation will be more suitable. In addition, there may be applications where it will be desirable to use separate transmit and receive transducers as shown in previously referenced U.S. Pat. No. 3,522,764 by placing one transducer in front of outlet 22 and the other behind or by placing them side by side.

If it is desired to have the temperature of the water from the faucet controlled automatically, a thermostatically controlled valve, such as commonly available ones using a bimetallic thermostat element, can be used instead of valves 14 and 16. Such a valve would eliminate the need for any adjustments by the user.

I claim:

1. A method of controlling the flow of fluid from a faucet having fluid outlet comprising:
   detecting the distance of an object from the faucet fluid outlet and whether the object is in a position where the fluid will flow onto the object from the fluid outlet;
   turning on the fluid flow when the distance is equal to or less than a predetermined limit and the object is in a position where the fluid will flow onto the object from the fluid outlet; and
   turning off the fluid flow when the distance is equal to or greater than a predetermined limit or the object is not in a position where the fluid will flow onto the object from the fluid outlet.

2. A method as in claim 1 wherein the step of detecting the distance of an object from the faucet fluid outlet further comprises the steps of:
   emitting an ultrasonic signal;
   detecting an ultrasonic echo; and
   measuring the time elapsed between the emission of the ultrasonic signal and the detection of the ultrasonic echo.

3. A method as in claim 2 wherein the step of turning on the fluid flow comprises detecting when the time elapsed between the emission of the ultrasonic signal and the detection of the ultrasonic echo is less than a predetermined time.

4. A method as in claim 3 wherein the step of turning off the fluid flow comprises detecting when the time elapsed between the emission of the ultrasonic signal and the detection of the ultrasonic echo is more than a predetermined time.

5. A method of controlling the flow of fluid from a faucet having a fluid outlet comprising:
   measuring the distance of an object from the faucet fluid outlet and detecting whether the object is in a position where the fluid will flow onto the object from the fluid outlet;
   causing the fluid to flow when the object is within a predetermined range of distances from the fluid outlet and the object is in a position where the fluid will flow onto the object from the fluid outlet; and
   preventing the fluid from flowing when the object is not within the predetermined range of distances or the object is not in a position where the fluid will flow onto the object from the fluid outlet.

6. A method as in claim 5 wherein the predetermined range of distances is adjustable.

7. A method as in claim 5 wherein the step of measuring the distance of an object from the faucet fluid outlet further comprises the steps of:
   emitting an ultrasonic signal;
   detecting an ultrasonic echo; and
   measuring the time elapsed between the emission of the ultrasonic signal and the detection of the ultrasonic echo.

8. A method as in claim 7 wherein the step of causing the fluid to flow comprises detecting when the time elapsed between the emission of an ultrasonic signal and the detection of an ultrasonic echo is within a predetermined range of elapsed times.

9. A method as in claim 8 wherein the predetermined range of elapsed times is adjustable.

10. A method of controlling the flow of fluid from a faucet having a fluid outlet comprising:
    measuring the distance of a surface from the faucet fluid outlet and detecting whether the surface is in a position where the fluid will flow onto the surface from the fluid outlet;
    causing the fluid to flow when the surface is within a predetermined range of distances from the fluid outlet and the surface is in a position where the fluid will flow onto the surface from the fluid outlet; and
    preventing the fluid from flowing when the surface is not within the predetermined range of distances or the surface is not in a position where the fluid will flow onto the surface from the fluid outlet.

11. A method as in claim 10 wherein the predetermined range of distances is adjustable.

12. A method as in claim 10 wherein the step of measuring the distance of a surface from the faucet fluid outlet further comprises the steps of:
    emitting an ultrasonic signal;
    detecting an ultrasonic echo; and measuring the time elapsed between the emission of the ultrasonic signal and the detection of the ultrasonic echo.

13. A method as in claim 12 wherein the step of causing the fluid to flow comprises detecting when the time elapsed between the emission of an ultrasonic signal and the detection of an ultrasonic echo is within a predetermined range of elapsed times.

14. A method as in claim 13 wherein the predetermined range of elapsed times is adjustable.

* * * * *